(12) United States Patent
Coleman et al.

(10) Patent No.: US 10,901,964 B2
(45) Date of Patent: *Jan. 26, 2021

(54) DATA MAPPER

(71) Applicant: INTERNATIONAL BUSINESS MACHINES CORPORATION, Armonk, NY (US)

(72) Inventors: Andrew J. Coleman, Petersfield (GB); John A. Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/237,847

(22) Filed: Jan. 2, 2019

(65) Prior Publication Data

US 2019/0155796 A1 May 23, 2019

Related U.S. Application Data

(63) Continuation of application No. 15/414,853, filed on Jan. 25, 2017, now Pat. No. 10,223,433.

(51) Int. Cl.
*G06F 7/00* (2006.01)
*G06F 16/215* (2019.01)
(Continued)

(52) U.S. Cl.
CPC ........ *G06F 16/215* (2019.01); *G06F 16/254* (2019.01); *G06F 16/90344* (2019.01)

(58) Field of Classification Search
CPC . G06F 16/215; G06F 16/90344; G06F 16/254
(Continued)

(56) References Cited

U.S. PATENT DOCUMENTS

| 6,026,398 A | * | 2/2000 | Brown ............... G06F 16/319 707/745 |
| 8,423,563 B2 | | 4/2013 | McPeake et al. |

(Continued)

OTHER PUBLICATIONS

Lait, A. J. et al.; An Assessment of Name Matching Algorithms; Retrieved from the Internet Sep. 28, 2016; URL: http://homepages.cs.ncl.ac.uk/brian.randell/Genealogy/NameMatching.pdf; 32 pages.
(Continued)

*Primary Examiner* — Md I Uddin
(74) *Attorney, Agent, or Firm* — Schmeiser, Olsen & Watts, LLP; William Hartwell

(57) ABSTRACT

A method and system for mapping data elements between a source data structure and a target data structure. A source data element is mapped to a target data element by matching a source key and value pair to a target key and value pair. A parent source Soundex key for each parent element of the source data element is created. A parent target Soundex key for each parent element of a plurality of target data elements snatching the first Soundex key of the source data element is created. The parent source Soundex key for each parent element of the source data element is compared with each parent target Soundex key. The source data element is mapped to the target data element having the parent target Soundex key that matches the parent source Soundex key.

17 Claims, 8 Drawing Sheets

(51) Int. Cl.
*G06F 16/903* (2019.01)
*G06F 16/25* (2019.01)
(58) Field of Classification Search
USPC .......................................... 707/754, 755, 763
See application file for complete search history.

(56) References Cited

U.S. PATENT DOCUMENTS

| | | |
|---|---|---|
| 9,026,514 B2 | 5/2015 | Allen et al. |
| 2011/0106792 A1 | 5/2011 | Robertson |
| 2017/0262426 A1* | 9/2017 | Diwan .................. G06F 16/334 |
| 2018/0210905 A1 | 7/2018 | Coleman et al. |

OTHER PUBLICATIONS

Shah, Rima; Improvement of Soundex Algorithm for Indian Language Based on Phonetic Matching; International Journal of Computer Science, Engineering and Applications (IJCSEA), vol. 4, No. 3; Jun. 2014; pp. 31-39.
IBM Knowledge Center; Mapping Input to Output Elements Automatically; Retrieved from the Internet Sep. 28, 2016; URL: https://www.ibm.com/support/knowledgecenter/SSMKHH_9.0.0/com.ibm.gdm.doc/cm28620_.htm; 3 pages.
Notice of Allowance (dated Oct. 15, 2018) for U.S. Appl. No. 15/414,853, filed Jan. 25, 2017.

* cited by examiner

DATA MAPPER

This application is a continuation application claiming priority to Ser. No. 15/414,853, filed Jan. 25, 2017.

TECHNICAL FIELD

The present disclosure relates generally to systems, methods and tools for auto mapping data elements between source and target data elements.

BACKGROUND

Soundex was originally developed by Margaret K. Odell and Robert C. Russel at the U.S. Bureau of Archives to simplify census taking in the early 1900s. Soundex is a phonetic algorithm for indexing names by sound, as pronounced in English. The goal is for data elements to be encoded to the same representation so that they can be matched despite minor differences in spelling. Surnames that sound the same but are spelled differently have the same code and are filed together. This system was developed to make it easier to find a particular name even though it may have been spelled (or misspelled). Soundex is the most widely known of all phonetic algorithms, as it is a standard feature of MS SQL and Oracle.

Over time, additional variations to Soundex have been created. A similar algorithm called "Reverse Soundex" prefixes the last letter of the name instead of the first. In 1970, the NYSIIS algorithm was introduced by the New York State Identification nd Intelligence System as an improvement to the Soundex algorithm. NYSIIS handles some multi-character n-grams and maintains relative vowel positioning, whereas Soundex does not. As a response to deficiencies in the Soundex algorithm, Lawrence Philips developed the Metaphone algorithm in 1990 for the same purpose as Soundex. Philips developed an improvement to Metaphone in 2000, which he called Double Metaphone. Double Metaphone includes a much larger encoding rule set than its predecessor, handles a subset of non-Latin characters, and returns a primary and a secondary encoding to account for different pronunciations of a single word in English.

SUMMARY

A first embodiment of the present disclosure provides a method for mapping data elements between a source data structure and a target data structure comprising the steps of: generating, by a processor, a Soundex key as a function of a Soundex algorithm applied to a source data element; pairing, by the processor, the Soundex key with a value equal to the source data element, forming a source key and value pair; storing, by the processor, the source key and value pair in the source data structure; further generating, by the processor, a second Soundex key as a function of the Soundex algorithm applied to a target data element; further pairing, by the processor, the second Soundex key with a second value equal to the target data element, forming a target key and value pair; further storing, by the processor, the target key and value pair in the target data structure; matching, by the processor, the source key and value pair to the target key and value pair; and mapping, by the processor, the source data element to the target data element as a function of matching the source key and value pair stored in the source data structure to the target key and value pair of the target data structure.

A second embodiment of the present disclosure provides a computer system comprising a processor; a memory device coupled to the processor; and a computer readable storage device coupled to the processor, wherein the storage device contains program code executable by the processor via the memory device to implement a method for mapping data elements between a source data structure and a target data structure comprising the steps of: generating, by the processor, a Soundex key as a function of a Soundex algorithm applied to a source data element; pairing, by the processor, the Soundex key with a value equal to the source data element, forming a source key and value pair; storing, by the processor, the source key and value pair in the source data structure; further generating, by the processor, a second Soundex key as a function of the Soundex algorithm applied to a target data element; further pairing, by the processor, the second Soundex key with a second value equal to the target data element, forming a target key and value pair; further storing, by the processor, the target key and value pair in the target data structure; matching, by the processor, the source key and value pair to the target key and value pair; and mapping, by the processor, the source data element to the target data element as a function of matching the source key and value pair stored in the source data structure to the target key and value pair of the target data structure.

A third embodiment of the present disclosure provides a computer program product comprising: one or more computer readable hardware storage devices having computer readable program code stored therein, said program code containing instructions executable by one or more processors to implement a method for mapping data elements between a source data structure and a target data structure comprising the steps of: generating, by a processor, a Soundex key as a function of a Soundex algorithm applied to a source data element; pairing, by the processor, the Soundex key with a value equal to the source data element, forming a source key and value pair; storing, by the processor, the source key and value pair in the source data structure; further generating, by the processor, a second Soundex key as a function of the Soundex algorithm applied to a target data element; further pairing, by the processor, the second Soundex key with a second value equal to the target data element, forming a target key and value pair; further storing, by the processor, the target key and value pair in the target data structure; matching, by the processor, the source key and value pair to the target key and value pair; and mapping, by the processor, the source data element to the target data element as a function of matching the source key and value pair stored in the source data structure to the target key and value pair of the target data structure.

DETAILED DESCRIPTION

Figure 1:
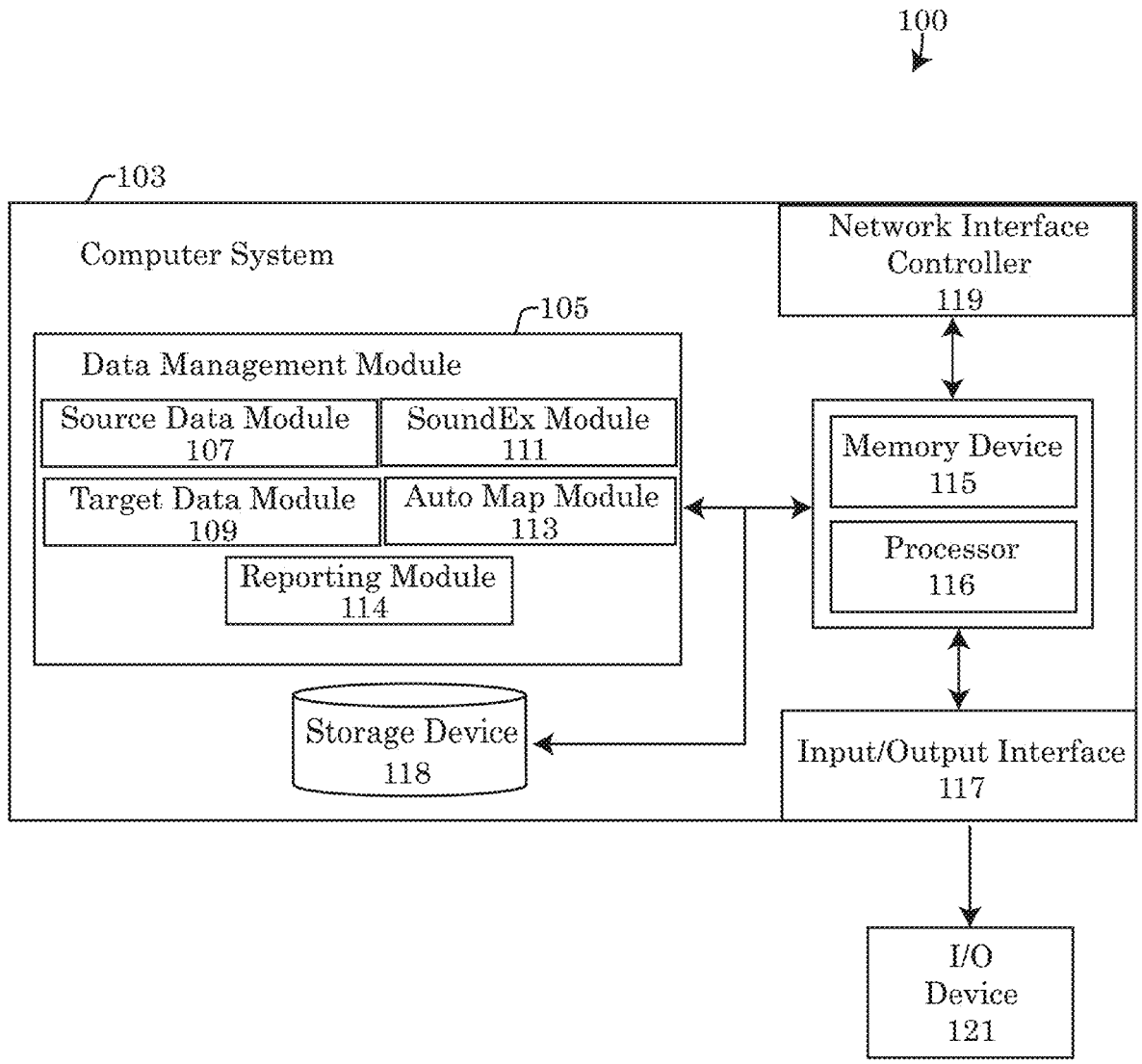
FIG. 1 depicts a block diagram of an embodiment of a system for mapping data elements between a source data structure and a target data structure.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Graphical data maps are used to transform data from one format to another. The source and target formats of the data may be represented by "schema" which may describe the "shape" of the data structure as well as the types of individual data elements with the data structure. Graphical data maps may define individual transforms from elements in the source structure in order to produce values of the elements within the target data structure. For example, a simple copy transform may copy the value of a source data element from a source data structure to a mapped target data structure.

Often, it may be useful to generate mappings between a source data structure and a target data structure using an auto mapping function in order to match the source and target data elements. Matching the source and target data elements may be performed by finding source data elements having the same name as the target data elements. Currently available auto mapping algorithms however fail to properly map source and target data elements when the names of the source and target data elements are not exactly the same. For instance, auto mapping may fail when either the source or target data elements are misspelled, use inexact wording or use slight variations to spell the same word.

One available solution for overcoming the shortcomings of requiring a perfectly matching source and target elements, may be to utilize a dictionary of synonyms. A computer system matching the target and source data elements may query the dictionary for alternative matches to a particular word present in the source and/or target data elements. Implementing a programming solution that utilizes a dictionary of synonyms can be unwieldly and negatively impact the performance of the computer system mapping the source and target data. Often, the auto mapping tools that rely on dictionaries are large in size, which can add complexity to the auto mapper program, slow performance as a result of an increased lookup time and increase the cost of keeping a dictionary current with the latest synonyms and technical words.

Embodiments of present disclosure improve upon currently available mapping systems, methods and tools for mapping data elements between a source data structure and a target data structure. The embodiments of the present disclosure are capable of mapping source data elements to target data elements without the needing exact names or a dictionary of synonyms. The embodiments of the present disclosure may be capable of auto mapping data elements with one or more misspellings and/or alternative spellings.

Embodiments of the auto mapping systems, methods and tools described in the present disclosure are able to map target and source elements that do not perfectly match forms in each representative data structure, without the incorporation of a dictionary of synonyms. Instead, embodiments of the computer system auto mapping the source and target data elements may utilizes Soundex algorithms to generate a key corresponding to each source and target data elements. Each Soundex key may be generated based on the phonetical sounds of the source and target data elements. By using phonetical sounds to generate the key, the Soundex algorithm allows for similarly sounding words, alternatively spelled words or misspelled words to generate the same Soundex key, creating equivalence between the naming of source and target data elements once the auto mapping function is implemented.

In some embodiments, the generated Soundex keys for each data element may be paired with a value describing the data element's name used to generate the Soundex key. Each of the key and value pairs may be organized and inserted into a source data structure or target data structure, depending on whether the key and value pairs derive from a source element or target element. For example, the key and value pairs may be inserted into a hash table, hash map, tree map or an array such as an associative array. Subsequently, auto mapping between the source data structure and the target data structure may be performed by executing a lookup function on each key in the source table and comparing the key with the keys stored in the target data structure. In some embodiments, when a single matching key is found, the auto mapper may proceed to match the source data element to the target data element. However, in some instances, where multiple matching keys are identified during the lookup function, the auto mapper may rely on applying the Soundex algorithm to each of the parent elements in the hierarchy of the source and target data elements. Similar to the source and target data elements, each of the corresponding parent elements in the hierarchy may have the Soundex algorithm applied recursively to each of the parent elements. The Soundex keys for each parent elements in the respective source or target hierarchy may be compared in a manner similar to the source and target elements. Comparing parent elements of the source and target elements may increase the accuracy of the data mapping and ensure that the data elements having matching keys are in fact corresponding data elements.

In alternative embodiments of the present disclosure, the systems, tools and methods may be modified to identify matching Soundex keys more broadly. Instead of creating a match between the source and target keys when the keys are a direct match, the auto mapper may be configured to allow for a broader range of variation between the keys. Embodiments of the auto mapper may be programmed with a tolerance between the keys. For example, the keys of the source and target elements may be within a range of difference between 0-100 and still be considered a match. In yet another alternative embodiment, the auto mapper may map the source data element to the target data element having the nearest key instead of either an exactly matching key (when an exact match is not found) or under a situation wherein a pre-configured tolerance for the matching of the keys has not be set.

System for Mapping Data Elements

Figure 2:
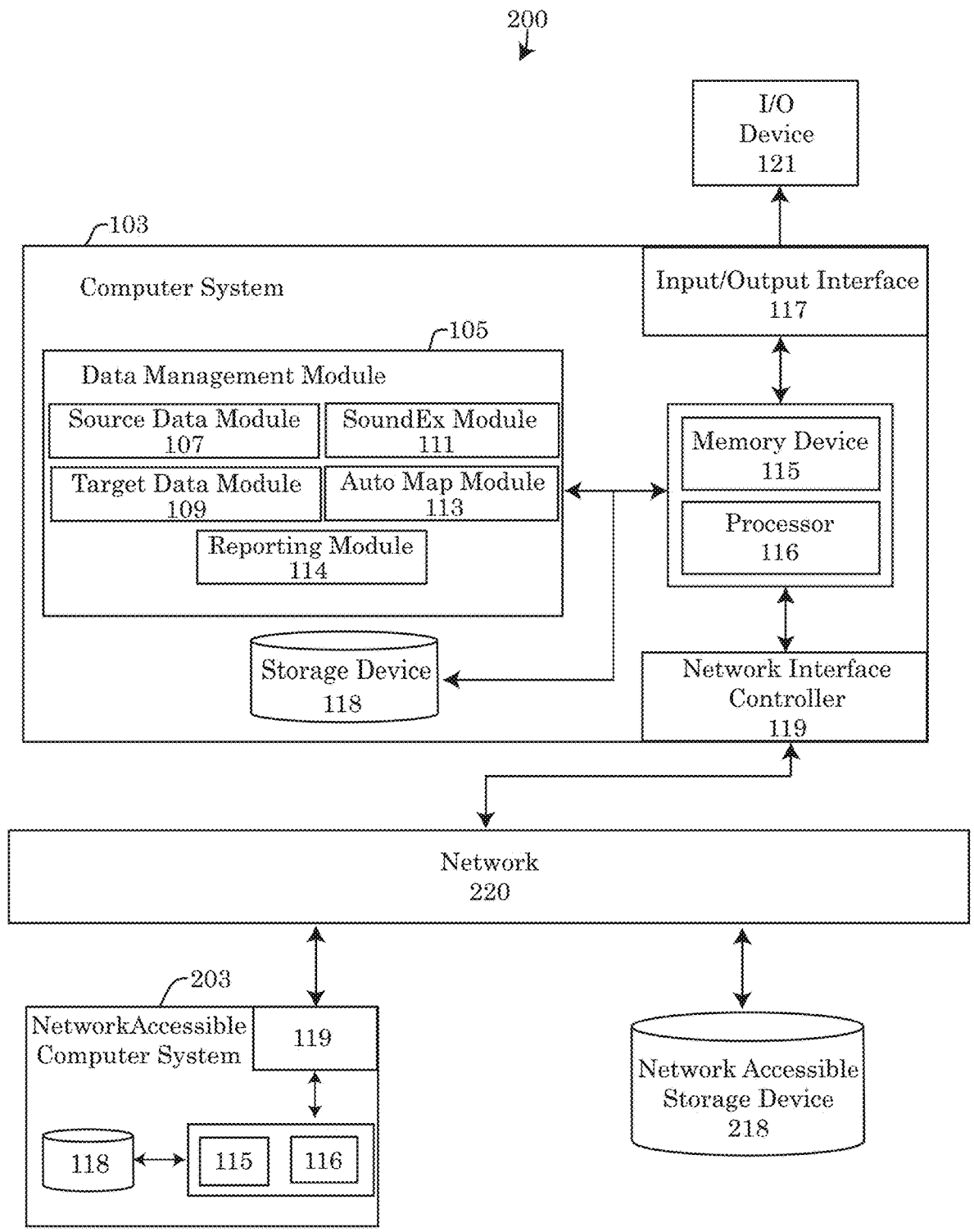
FIG. 2 depicts a block diagram of an alternative embodiment of a system for mapping data elements between a source data structure and a target data structure.

Referring to the drawings, FIG. 1 illustrates a diagram of an embodiment of a system 100, for mapping data elements between a source data structure and a target data structure, consistent with the disclosure of this application. Embodiments of system 100 may comprise a specialized computer system 103 having a specialized configuration of hardware, software or a combination thereof as depicted in FIGS. 1-2 and as described throughout the present disclosure. Embodiments of the computer system 103 may further comprise one or more elements of the generic computer system 800 of FIG. 6, described in detail below. The elements of the generic computer system 800 may be integrated into each of the specialized computer systems 103 described herein.

Embodiments of the computer system 103 may be a specialized computer system which may include a processor 116, specialized hardware or circuitry and/or software loaded in the memory device 115 of the computer system 103. The embodiments of the computer system 103 may perform functions, tasks and routines relating to creating and storing target and source data elements 401, generating Soundex keys, pairing the Soundex keys with a value pair, inserting the key and value pair into a source data structure 709 or target data structure 712, auto mapping source data elements 401 to target data elements 401 and reporting the mappings of the data elements to a user of the computer system 103.

Embodiments of the specialized hardware and/or software integrated into the computer system 103 may be part of a data management module 105. The hardware and/or software components of the data management module 105 may include a source data module 107, a target data module 109, a Soundex module 111, an AutoMap module 113 and a reporting module 114. As used herein, the term "module" may refer to a hardware module, software-based module or a module may be a combination of hardware and software resources of the computer system 103 and/or resources remotely accessible to the computer system 103 via a computer network 220.

Each of the computer system 103, 203 may be connected and placed in communication with one another over a computer network 220. Embodiments of the network 220 may be constructed using wired or wireless connections between each hardware component connected to the network 220. As shown in the exemplary embodiment 200 of FIG. 2, each of the computer systems 103, 203 may connect to the network 220 and communicate over the network 220 using a network interface controller (NIC) 119 or other network communication device. Embodiments of the NIC 119 may implement specialized electronic circuitry allowing for communication using a specific physical layer and a data link layer standard, such as Ethernet, Fiber channel, Wi-Fi or Token Ring. The NIC 119 may further allow for a full network protocol stack, enabling communication over network 220 to the group of computer systems or other computing hardware devices linked together through communication channels. The network 220 may facilitate communication and resource sharing among the computer systems 103, 203 and additional hardware devices connected to the network 220, for example a network accessible storage device 218 or other network accessible data repositories connected to the network 220. Examples of network 220 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Embodiments of the modules described in this application, whether comprising hardware, software or a combination of resources thereof, may be designed to implement or execute one or more particular functions, tasks or routines of the computer system 103 described herein. Embodiments of hardware-based modules may include self-contained components such as chipsets, specialized circuitry and one or more memory devices comprising a memory storage medium (described below). A software-based module may be part of a program code or linked to program code or computer code 897, 898 containing specific programmed instructions loaded into the memory device 115 of the respective computer system 103, and/or a remotely accessible memory device 115 of a network accessible computer system 203. For example, in some embodiments the network accessible computer system 203 may be a web server, application server, or network accessible hardware, such as a network accessible storage device 218 which may comprise one or more data elements 401 and/or data structures.

In some embodiments of the computer system 103, the data management module 105 may include one or more sub-modules that may be assigned to perform one or more particular tasks and functions of the computer system 103. The types and number of sub-modules may vary from embodiment to embodiment depending on the components and arrangement of components featured in the system 100, 200. However, in the exemplary embodiments shown in FIGS. 1-2, the data management module 105 may comprise a source data module 107, a target data module 109, a Soundex module 111, an AutoMap module 113 and a reporting module 114.

Embodiments of the source data module 107 may retrieve, collect, organize and store one or more data elements 401 from a data source in the memory device 115 of the computer system 103. A "data element 401" may identify the data stored within each section of a data structure (such as a table). The data element 401 may specifies the type of data inserted into the data structure for the designated portion of the data structure and the transforms that may be applied to the data defined by the data element 401. Each data element may have its own specific set of transforms which relate it to other data elements. When the data elements associated with the columns of a target data structure are not the same as the data elements of the source data structure, a transform may be applied to the data to convert the data into the appropriate form for application within the target data structure.

In some embodiments of the source data module 107, the source data module may provide tools that may utilized by a user for creating a source data structure 709 from data collected by or available to the computer system 103. A user of the computer system 103 may provide user input into the computer system 103 to create the source data structure 709 and a user may define each of the fields within the data structure identified by one or more data elements 401 defining the data stored within each of the fields. Alternatively, in some embodiments, the source data structure 709 may have been previously created and stored in a computer readable storage device, for example storage device 118. The source data module 107 may import the data structure 401 from the computer readable storage device. The importation of the source data structure may be from a locally accessible storage device 118 or remotely import the source data structure 709 via network 220 from a network accessible storage device 218 or a network accessible computer system 203. The source data structures 709 retrieved by the source data module 107 may be loaded into the memory device 115 of the computer system 115 for further transform, modification, editing, or auto mapping of the source data elements 401 to a target data structure 712.

Similar to the source data module 107, the target data module 109 may include one or more tools that may be utilized for creating a target data structure 712 from data collected by, or available to the computer system 103. The user of the computer system may provide one or more user inputs into the computer system 103 to create the target data structure 712. The user may define each of the fields within the target data structure 712 with one or more data elements 401. Moreover, much like the source data structure 709, the target data structure 712 may also be a pre-existing data structure imported into the target data module 109 from a computer readable storage device or storage medium. The target data structure 712 may be imported from a local storage device 118, a network accessible storage device 218 or from a network accessible computer system 203) may include web server, application server, client device, etc.

The source data structure 709 and the target data structure 712 may be identified by the purpose of each data structure during the performance of the auto mapping function (described in detail below). The source data structure 709 may be the data structure comprising the location where the data is being auto mapped from, while the target data structure 712 may be the structure where the auto mapping function is being applied to, using the data from the source data structure 709. In some embodiments, the source data structure 709 and the target data structure 712 do not have to be different schemas or different structures from one another. In some embodiments, the source data structure 709 and the target data structure 712 may be the same data structure.

Figure 3:
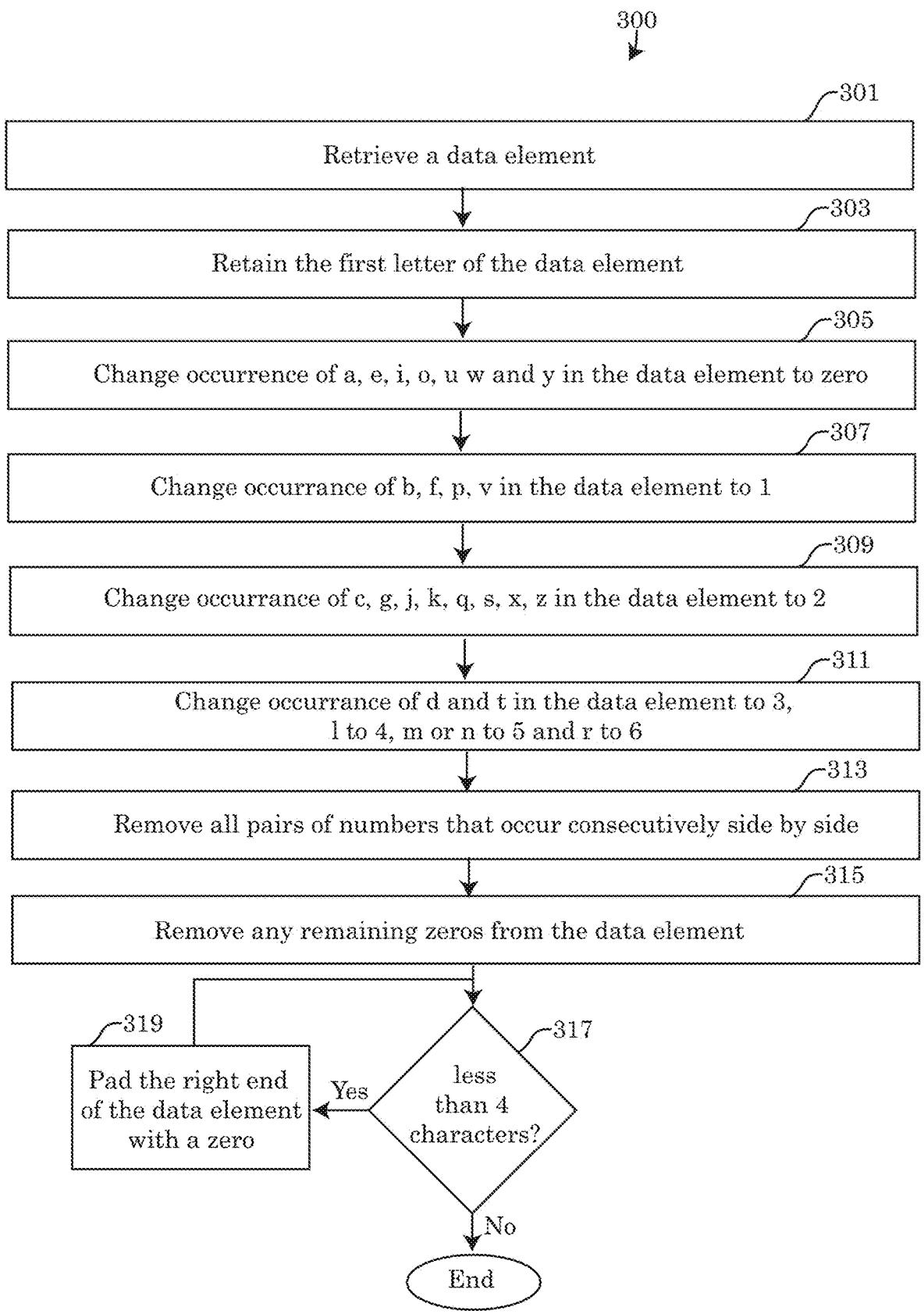
FIG. 3 depicts an embodiment of an algorithm for generating a Soundex key.
Figure 4:
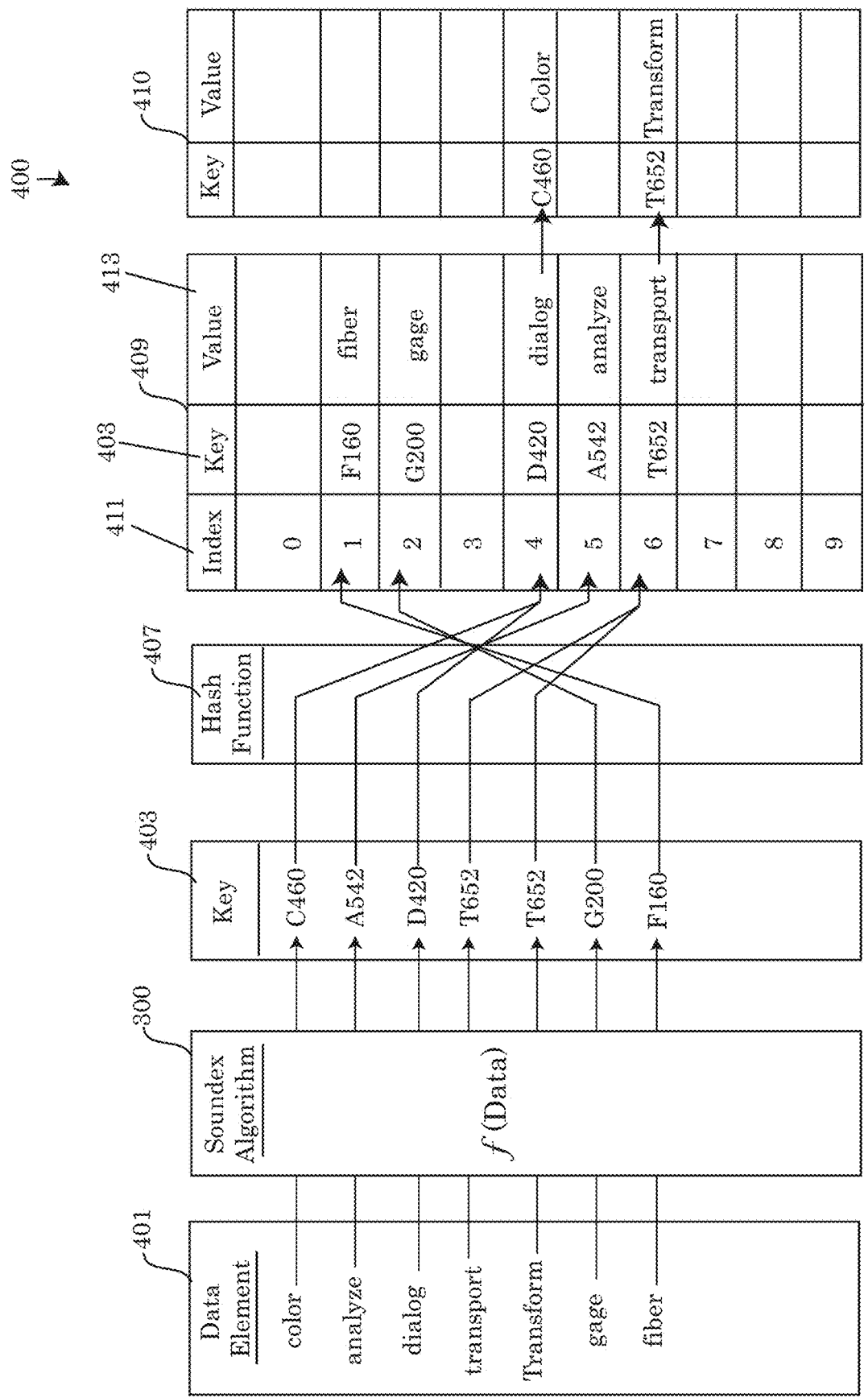
FIG. 4 depicts a graphical representation of an embodiment of a computer system converting a string into a Soundex key and storing the Soundex key as a key-value pair in a data structure.
Figure 5:
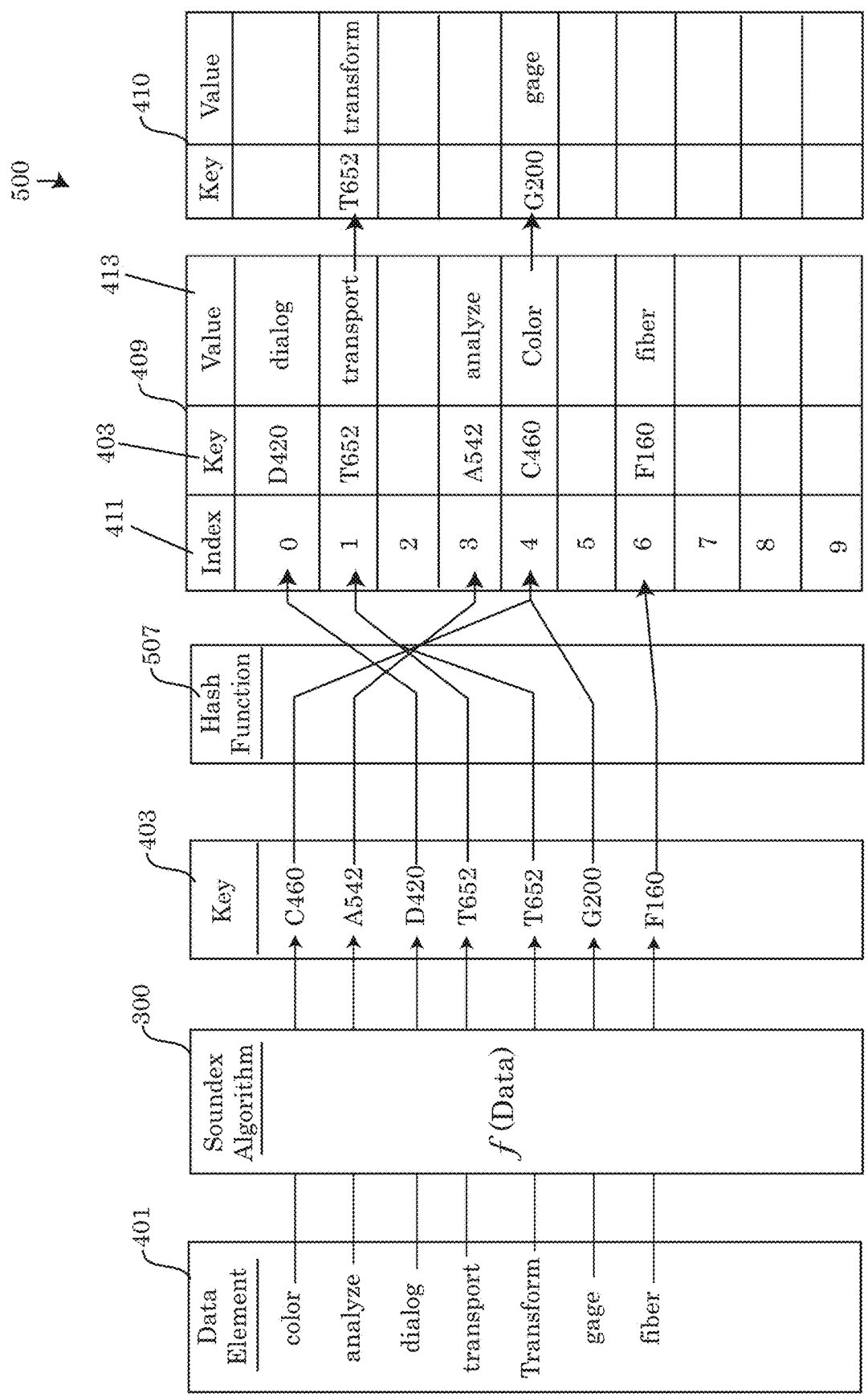
FIG. 5 depicts a graphical representation of an alternative embodiment of a computer system converting a string into a Soundex key and storing the Soundex key as a key-value pair in a data structure.

Embodiments of the data management module 105 may further include the Soundex module 111. The Soundex module 111 may perform the function or task of applying the Soundex algorithm to one or more data elements 401 stored in the source data structure 709 and/or the target data structure 712. The Soundex algorithm may perform the function of converting each data element 401 into a key 403 using one or more rules of the Soundex algorithm as shown in FIGS. 3-5. The Soundex module 111 may further perform the hash function 407, indexing each key 403 within the appropriate indices of the data structure and pairing the key 403 with a respective value 413 corresponding to the data element 401.

Referring to the drawings, FIG. 3 describes a Soundex algorithm 300 for encoding a Soundex key 403 from the input of a data element 401 stored by a data structure. In step 301 of the Soundex algorithm 300, the Soundex module 111 may retrieve or load a data element 401 into the Soundex module 111 for conversion to a Soundex key 403. In step 303, the Soundex module 111 may retain the first letter of the data element 401 and input the retained first letter into the first position of the key. For example, a data element 401 "color" having a Soundex key 403 of C460 retain the "C" in the first position of the key 403. Likewise a data element 401 described in the data structure as "dialog" has a key 403 of D420, wherein the "D" is retained in the first position of the key.

In step 305 of the embodiment of the Soundex algorithm 300, each occurrence of a, e, i, o, u, w and y in the data element 403 may be converted to a zero. Moreover, in step 307, each occurrence of the consonants b, f, p and v within the data element 403 may be converted to the number 1. Likewise, in step 309, each occurrence of the consonants c, g, j, k, q, s, x, and z within the data element 403 may be converted to the number 2 by the Soundex module 111. Similar to steps 305, 207, and 309, in step 311 of the Soundex algorithm 300, the Soundex module 111 may further convert the consonants d and t to the number 3, the consonant "l" to the number 4, m or n to the number 5 and the consonant "r" to the number 6.

In step 313 of the Soundex algorithm 300, the Soundex module 111 may proceed to remove the pairs of numbers that occur consecutively side by side after the conversions of the data elements 403 performed in steps 305 to 311. In step 315, the Soundex module 111 may further remove any remaining zeros that may be present within the converted data element. Once the zeros have been removed in step 315, the Soundex module 111 may perform a check in step 317 to ensure that the length of the Soundex key 403 is the appropriate length. In step 317, the Soundex module 111 may determine whether or not the converted data element resulting in step 315 is less than four characters in length. If, a determination is made in step 317 that the converted data element is the appropriate length of four characters, the Soundex module 111 may create a Soundex key corresponding to the converted data element of step 315. Conversely, if, in step 317, the Soundex module 111 determines that the converted data element resulting in step 315 is less than the requisite length, the Soundex algorithm 300 may proceed to step 319, whereby the converted data element is padded with a zero at the right most position, until the requisite Soundex key 403 length is achieved. As depicted in FIGS. 3-5, the standard Soundex key length may be four characters long.

Referring to the drawings, FIG. 4 depicts an embodiment 400 of the Soundex module 111 converting the data elements 401 into Soundex keys 403 and storing each of the keys 403 as a key 403 and value 413 pair in a data structure such as a table 409 or array. As exemplified by the figure, each data element 401 may have the Soundex module 111 apply the Soundex algorithm 300 (as described above) to each respective the data element 401. The resulting Soundex key 403 derived from the Soundex algorithm 300 being applied to the data element 401 may vary as a function of the data element (abbreviated f(Data)) having the algorithm 300 being applied thereto, as shown by the plurality of different Soundex keys 403 generated.

As shown in FIG. 4, different data elements 401 yield different keys 403 based on the phonetic sounds of the data elements. Similarly sounding data elements 401 may yield similar or identical keys 403. By allowing for similar sounding data elements 401 to yield the similar or the same key 403, minor variations in spelling or the occurrence of misspellings may still generate the same key 403 for the data element 401 and allow the data element 401 to be properly mapped to the correct data element of a target data structure 712. For example, data elements 401 of "color" and "transport" are not phonetically similar. As expected, the resulting keys 403 are overall very different. The Soundex module 111 may encode a key 403 for the data element "color" corresponding to C460, while the Soundex module may encode a key for "transport" corresponding to T652. The difference in both letter and number value may indicate the large phonetic difference between the two data values. Conversely, the data element "transform" is phonetically very similar to "transport". In fact, the Soundex module 111 may generate the key 403 of T652 for both "transform" and "transport" as shown in FIGS. 4-5.

As shown in FIG. 4, each key 403, once encoded, may be organized into a data structure. In the embodiment 400 depicted in the figure, a hash table 409 is shown as the exemplary embodiment. However, other data structures may be used to organize the key 403 and value 413 pairs encoded by the Soundex module 111. For example, in addition to tables, the data structure used may include arrays, associative arrays, hash maps, tree maps, files or records. In the exemplary embodiments 400, 500 using a hash table 409, the Soundex module 111 may perform a hash function 407 on each of the Soundex keys 403 encoded by the Soundex Module 111. Hashing each Soundex key 403 may organize each the key 403 and value 413 pair into the appropriate index 411 of the hash table 409, allowing for faster lookups and comparisons by the computer system, particularly by the auto mapping module 113 performing the auto mapping function between source data structures 709 and target data structure 712.

Embodiments of the hash function 407 may determine the placement of the key 403 and value 413 pair within the hash table 409 at the appropriate index 411. The mechanism for generating a hash value using the hash function 407 may differ depending on the programmed rules of the hash function 407. The hash function 407 may act as a preset rule for determining the index 411 to place each of the key 403 and value 413 pairs. The embodiments 400 and 500 depict an example of using different hash functions 407, 507 to sort each of the Soundex keys 403, resulting in differences between the organization of the hash tables 409.

In FIG. 4, the hash function 407 organizes the data into each respective index 411 using the first number to appear in the key 403 and assigning the key 403 and value 413 pair to the index 411 corresponding to the first number. For example, the data element 401 for "fiber" encodes a key 403 of F160. The first number to appear in F160 is the number "1". Applying the hash function 407 to key F160, the hash function 407 would place the key 403 value 413 pair for F160 into index number "1". Comparatively, the hash function 507, organizes each of the key 403 and value 413 pairs differently. In the particular embodiment 500, the hash function 507 divides the numerals present in each key 403 by the total number of data elements 401 present and places each key 403 and value 413 pair into the index 411 corresponding to the remainder after the division function is performed. For instance, using the data element "fiber" having a key 403 of F160 as an example, 160 divided by 7 is equal to 22 with a remainder of 6. Since "6" is the reminder, F160 is organized into index 411 number "6" of the hash table 409.

In some embodiments of the hash tables 409, multiple key 403 and value 413 pairs may occupy the same index number 411. While distributing and assigning the key 403 and value 413 pairs to the hash table 409, the Soundex module 111 may create a subsequent entry 410 in a particular index 411 if a previous entry of the hash table 409 is occupied by a first key 403 and value 413 pair. For example, in embodiment 500, key 403 and value 413 pairs for the data element 401 "color" and "gage" are both organized into index 411 number "4". Since the Soundex module 111 assigns the key 403 and value 413 pair to "color" first, key C460 having the value 413 of "color" is entered into the first entry of index 411 number "4". Subsequently, when the Soundex module 111 calculates the index 411 for the key "G200" having a value of "gage", is also index 411 number "4" the Soundex module 111 may create a subsequent entry 410 and enter G200 under key 403 and "gage" under the value 413.

In some embodiments, a pointer may be added to the previous entry of the index 411, indicating to the Soundex module 111 or the auto mapper module 113 that there are a plurality of entries within the same index 411. During the insertion phase of each data element 401 into the hash table 409 as a key 403 and value 413 pair, or during the performance of a lookup function of a particular data element 401, the computer system 103 may query each subsequent entry of a particular index 411 until the appropriate key 403 being queried is identified, or there are not any additional pointers within the index 411 (the last entry is "null") to a subsequent entry. During the encoding and hashing phase of creating the data structures, the Soundex module 111 may proceed to the last entry of the appropriate index 411 and add a subsequent pointer within the existing entry to the new key 403 and value 413 pair being inserted into the data structure. Any number of subsequent entries into a particular index 411 may be added as a function of the number of data elements 401, being hashed 407, 507 by that Soundex module 111, that are calculated to correspond to the particular index of the hash function 407, 507.

Referring back to FIGS. 1-2, the data management module 105 of computer system 103 may further comprise an auto mapping module 113. The auto mapping module 113 may perform the function of mapping data elements 401 stored in a source data structure 709 as a source key 403 and value 413 pair to a target data structure 712 storing complimentary data elements as target key and value pairs. In some embodiments, the auto mapping module 113 may further perform one or more data transformations (or data transforms). A "data transform" may convert the set of data values from a data format in the source data structure 709 into the appropriate data format of the target data structure 712.

Embodiments of auto mapping module 113 present n the disclosed system 100, 200 offers the ability of the computer system 103 map and transform data between source data structures 709 and target data structures 712 comprising data elements that have been encoded as a Soundex key 403 and value 413 pair. Using the Soundex algorithm 300 to encode data elements within the source data structures 709 and the target data structures 712, allows increased flexibility between target data elements and source data elements, reducing the risk of errors, increasing the functionality of the system and avoiding the need for dictionary systems that may reduce the performance of the computer system 103. Using the Soundex algorithm 300 to encode Soundex keys 403 for the mapping process also allows for alternative spellings or misspellings of the data elements stored by the source and target data structures 709, 712 without returning an error or incorrect mappings.

Figure 7:
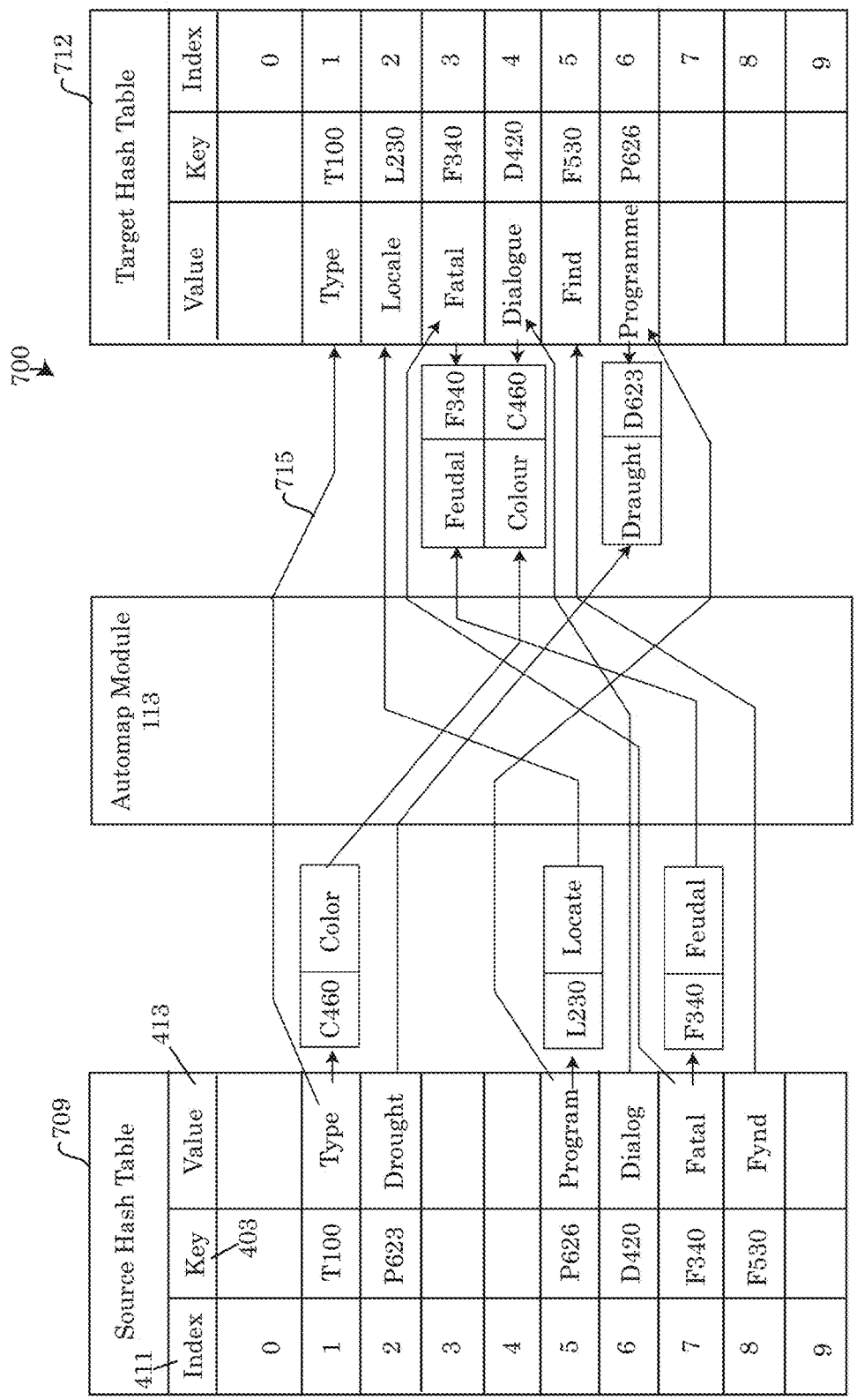
FIG. 7 depicts a graphical representation of a computer system mapping data elements between a source data structure and a target data structure.

FIG. 7 describes an embodiment 700 of the auto mapping module 113 performing a mapping function from a source data structure 709 to a target data structure 712. Embodiments of the source data structure 709 and the target data structure 712 depicted in embodiment 700 have been previously created by the Soundex module 111, encoding a plurality of data elements 401 to each respective data structure 709, 712 as a Soundex key 403 and value 413 pair. In some embodiments, each of the data structures 709, 712 may be created using the same methods for organizing the data structures, such that source key and value pair are indexed within the index 411 number as the corresponding target key and value pair of the target data structure 712. However, as it is shown in FIG. 7, the data elements encoded into the source data structure 709 were encoded using the Soundex algorithm 300 and indexed using hashing function 507, whereas the data elements 401 of the target data structure 712 were indexed using hashing function 407.

Embodiments of the auto mapping module 113 may perform a lookup function to compare a selected source key 403 with the target keys stored by the target data structure 712. If the lookup function returns as single matching key 403 to the source key, the auto mapping module 113 may map the key 403 and value 413 pair of the source data structure 709 to the key 403 and value 413 pair of the target data structure. For example, using key T100 having the value of "Type", the auto map module 113 may perform the lookup in the target data structure for the presence of the T100 key. As shown in FIG. 7 by the mapping indicator 715, a T100 key is present in index 1 of the target data structure 712. In some embodiments, the auto mapping module 113 may further compare the values 413 of each target key matching the source key being queried by the auto map module 113. In the example using the T100 key, the source value of "Type" perfectly matches target value of "Type". Since there are no additional data elements encoded into index 1, the auto mapping module 113 may perform the mapping function between the source and target data structures for the "Type" data element.

In some embodiments, there may be a single entry in an index of the target data structure that matches the key 403 of the source data element, but the value 413 of the source key and value pair may not match the value 413 of the target key and value pair. Under such circumstances, the auto mapping module 113 may proceed to map the entries of the data structures 709, 712 having matching source and target keys 403. For example, using the Soundex key L230 having the value "Locate", the auto mapping module 113 may query the target data structure 712 and perform a lookup function for a matching L230 key. As shown in FIG. 7, a matching L230 Soundex key is present in the target data structure 712. However, the value of the L230 key is "Locale" and does not specifically match the source data element "Locate". Since there are not any additional L230 keys present in the target data structure 712, the auto mapping module 113 may presume the L230 keys should be mapped from the source data structure 709 to the target data structure 712.

In an alternative embodiment of the situation described using the L230 key as an example of a situation where the Soundex keys 403 match but there is a mismatching value, the auto mapping module 113 may use the parental hierarchy of each data element 401 to further determine whether or not the key and value pairs should be mapped to one another. For instance, each of the parent source data elements and the parent target data element may be encoded using the Soundex algorithm 300 and compared using the auto mapping module. If, the Soundex keys of the parental data elements in the source and target hierarchy match, in addition to the matching Soundex keys 403 of the data elements themselves, the auto mapping module 113 proceed to map the source data element to the target data element.

In some alternative embodiments, there may be more than one entry within the target data structure 712 having a Soundex key 403 matching a Soundex key of the target data structure. For example, in FIG. 7, an auto mapping module 113 may be attempting to map the data element having the key F340 having the value for "feudal". While performing the lookup function on the target data structure 712, the auto mapping module 113 may return two results as shown in the example. The first may be found within the first entry of index 3, a Soundex key for F340 and a value of "fatal". Since the values of the F340 key do not match the value of the first entry in the target data structure 712, the auto mapping module 113 may proceed to examine the second entry having the F340 key and a value of "feudal". Accordingly, in light of the source key and value pair in the source data structure matching the target key and value pair of the second entry in the target data structure, the auto mapping module 113 may perform the mapping function between the F340 keys having the "feudal" value.

It should be noted, that there may be an occasion when the lookup function performed by the auto mapping module returns multiple matching Soundex keys and none of the values in the plurality of target entries of the target database match. For example, using the lookup of the F340 key for "Feudal" in order to auto map the data element to the target data structure, "Feudal" may be misspelled in the value of the target data structure as "Fuedal". During the lookup function, the auto mapping module 113 may return the two key and value pairs for the F340 key, including the "Fatal"/F340 key and the "Fuedar"/F2340 key. While both keys match the F340 key being mapped, none of the values correspond perfectly. Accordingly, under such a situation, the auto mapping module 113 may proceed to apply the Soundex algorithm 300 to parent source data elements of the source data structure as well as the target source data elements for both the "Fatal"/F340 key and the "Fuedal"/F340 key pair. Accordingly, the mapping module 113 may map may determine that the Soundex keys generated for the parental source data elements match the parental target elements match of the "Fuedal"/F340 key pair. Thus the auto mapping module may proceed to map the source key and value pair of F340/Feudal to the target key and value pair of F340/Fuedal, compensating for the typographical error.

In some embodiments of the system 100, 200, the auto mapping module 113 may not require the source Soundex key to match the target Soundex key perfectly. The auto mapping module 113 may be programmed or configured to allow for a broader scope of similar Soundex keys, indicating similar (hut not exact) data elements to be acceptable for performing the mapping function thereon. For example, the auto mapping module 113 may be programmed to allow for a tolerance of between 0-10, 0-25, 0-50, 0-100, 0-200 or more variation in the numerical values of the target and source Soundex keys and still perform the mapping function For example, in the source data structure 709, a data element labelled "location" may have a Soundex key of L235, whereas a target data structure 712 may have a mappable data element with a slightly different key and value pair using the target data element locale having a Soundex key L230. If there is an acceptable level of variation between the keys that may be configured into the auto mapping module 113, the L235 key and value pair may be mapped to the targeted L230 key and value pair.

In yet another alternative embodiment, the auto mapping module 113 may be configured to perform the mapping function from source to target data structures 709, 712 for the nearest target key and value pair that is closest to the source key and value pair. Under such an embodiment, there would not be a limit to the amount of variation between the keys. Rather, the data elements that are most closely matched relative to the remaining data element key and value pairs will be mapped by the auto mapping module 113. The closest matching embodiment may allow for the auto mapping module 113 to dynamically determine the closest matching key and value pairs between the source and target data structures 709, 712 without selecting or programming a pre-configured margin.

Embodiments of the data management module may further comprise a reporting module 114. The reporting module 114 may be responsible for reporting and displaying output from the computer system 103 in a readable format that a user may understand, indicating the results of the auto mapping function or the data elements present in both the source and target data structures 709, 712. Reporting information and output information received by the reporting module 114 from the source data module 107, target data module 109, Soundex module 111 or the auto mapping module 113 may be displayed via the input/output (I/O) interface on an I/O device 121. In the exemplary embodiment, the reporting module 114 may display the output of the data management module on a display device or computer screen communicating with the computer system 103.

Method for Mapping Data Elements

Figure 6:
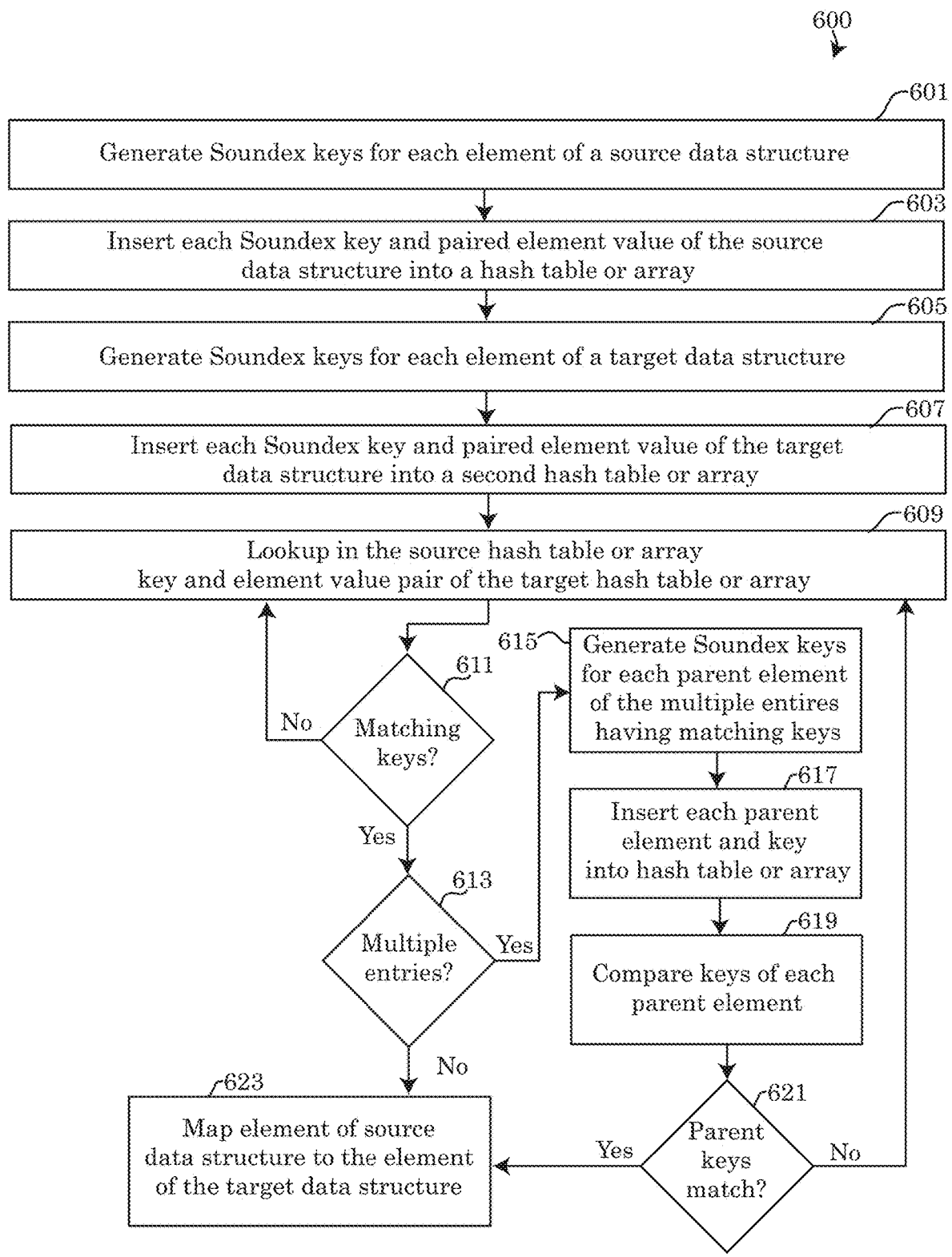
FIG. 6 depicts an embodiment of an algorithm for mapping data elements between a source data structure and a target data structure.

The drawing of FIG. 6 represents an embodiment 600 of a method that may be implemented for mapping data elements between a source data structure 709 and a target data structure 712 in accordance with the systems described in FIGS. 1-5 and 7 using one or more computer systems defined generically in FIG. 8 below, and more specifically by the specific embodiments depicted in FIGS. 1-5 and 7. A person skilled in the art should recognize that the steps of the method described in FIG. 6 may not require all of the steps disclosed herein to be performed, nor does the algorithm of FIG. 6 necessarily require that all the steps be performed in the particular order presented. Variations of the method steps presented in FIG. 6 may be performed, wherein one or more steps may be performed in a different order than presented by FIG. 6.

The algorithm 600 described in FIG. 6 may initiate in step 601 by generating a Soundex key 403 for each data element 401 stored the source data structure. The source data module 107 may retrieve the source data element and/or load the source data element into a memory device 115 of the computer system 103 performing the algorithm 600. Each Soundex key 403 may be encoded by the Soundex module 111 by applying the Soundex algorithm 300 to each the source data element loaded into the memory device 115 of the computer system 103. As a result of encoding the source data element using the Soundex module 111, a Soundex key may be created. The Soundex module 111 may pair the encoded Soundex key derived from the source data element with a value that may be equal to the source data element from which the Soundex key is encoded therefrom. For example, a source data element for "color" may be encoded using the Soundex algorithm 300 to create a corresponding Soundex key, "C460" having an assigned value of "color". Likewise, a source data element for "dialog" may be encoded into a Soundex key "D420" having an assigned value of "dialog".

In step 603 of the method 600, the Soundex module 111 may organize the Soundex keys and paired values encoded from each of the source data elements by inserting each Soundex key and value pair into a source data structure. For example, in the exemplary embodiment described above, the Soundex module 111 may create a source hash table 709 by using the hashing function 407, 507 to index each of the Soundex keys and value pairs deriving from the source data elements.

In step 605, the Soundex module 111 of the computer system 103 may generate a second set of Soundex keys for each element of the target data structure 712 that a user may be seeking to map the source data elements to. Similar to the source data elements above, target data module 109 may retrieve target data elements from one or more storage devices 118, remotely accessible computer systems 203 and/or remotely accessible computer storage devices 218. The target data module 109 may load the retrieved target data elements into the memory device 115 of the computer system 103 for conversion into a Soundex key 403. The Soundex module 111 may encode the Soundex keys 403 for each of the target data elements loaded into the memory device 115 by the target data module 109 by applying the Soundex algorithm 300.

In step 607 of the algorithm 600, the target Soundex keys 403 generated in step 605 may be organized by the Soundex key and inserted into a target data structure. In the exemplary embodiment, the Soundex module 111 may perform a hash function on each of the target Soundex keys 403 to calculate an index for each target Soundex key. Once the index is calculated, the target Soundex keys may be entered into the target data structure and paired with a value equal to the target data element used to derive the Soundex key.

Once the target Soundex keys and the source Soundex keys have been encoded and entered as key value pairs in each respective target or source data structure, in step 609, the auto mapping module 113 of the system 100, 200 may perform lookup function comparing and matching the Soundex keys 403 of the source data structure 709 with the Soundex keys of the target data structure 712. During the lookup function, the auto mapping module 113 may search through the target data structure for each Soundex key. In step 611, the auto mapping module 611 with make a determination regarding whether or not source Soundex key being mapped matches the Soundex key of the target data structure.

If, in step 611, the target Soundex key does not match source Soundex key being queried, the auto mapping module 113 may continue searching and comparing Soundex keys in the target data structure 712 with the source Soundex key that is the subject of the mapping at the moment. If, the source Soundex key matches the target Soundex key, the algorithm 600 may move on to step 613. In step 613, the auto mapping module 113 may identify whether or not a plurality of target Soundex keys match the source Soundex key being queried. A plurality of target Soundex keys may be evident from multiple entries in the target data structure bearing the same Soundex key.

If, in step 613, the auto mapping module 113 does not identify multiple Soundex keys in the target data structure bearing a matching Soundex key to the source Soundex key, the auto mapping module may, in step 623 map the key and value pair corresponding to the source data element to the key and value pair of the target data structure. Conversely, if, in step 613, there are multiple entries in the target data structure bearing a matching Soundex key to the source Soundex key, the algorithm may proceed to step 615.

Step 615 of the algorithm for mapping data elements, may further operate to identify the correct target Soundex key that should be mapped from the Source data structure. To further improve the accuracy of the auto mapping module 113, the parent elements in the hierarchy of the source Soundex key and the parent elements of the target Soundex key may be generated for each parent element. In step 617, each parent Soundex key derived from the matching target Soundex key may be organized and inserted into a hash table, array or other data structure while the patent source Soundex keys may be organized and inserted into a separate hash table, array or data structure than the parent target Soundex keys. In step 619, the auto mapping module 113 may compare each parent Soundex key of the target keys identified in step 611 with the Soundex keys of each parent source key. If, in step 621 it is determined that the parent keys of the source and target keys do match, the auto mapping module 113 may proceed to map the source key and value pair stored in the source data structure to the target key and value pair of the target data structure as described above in step 623.

Computer System

Figure 8:
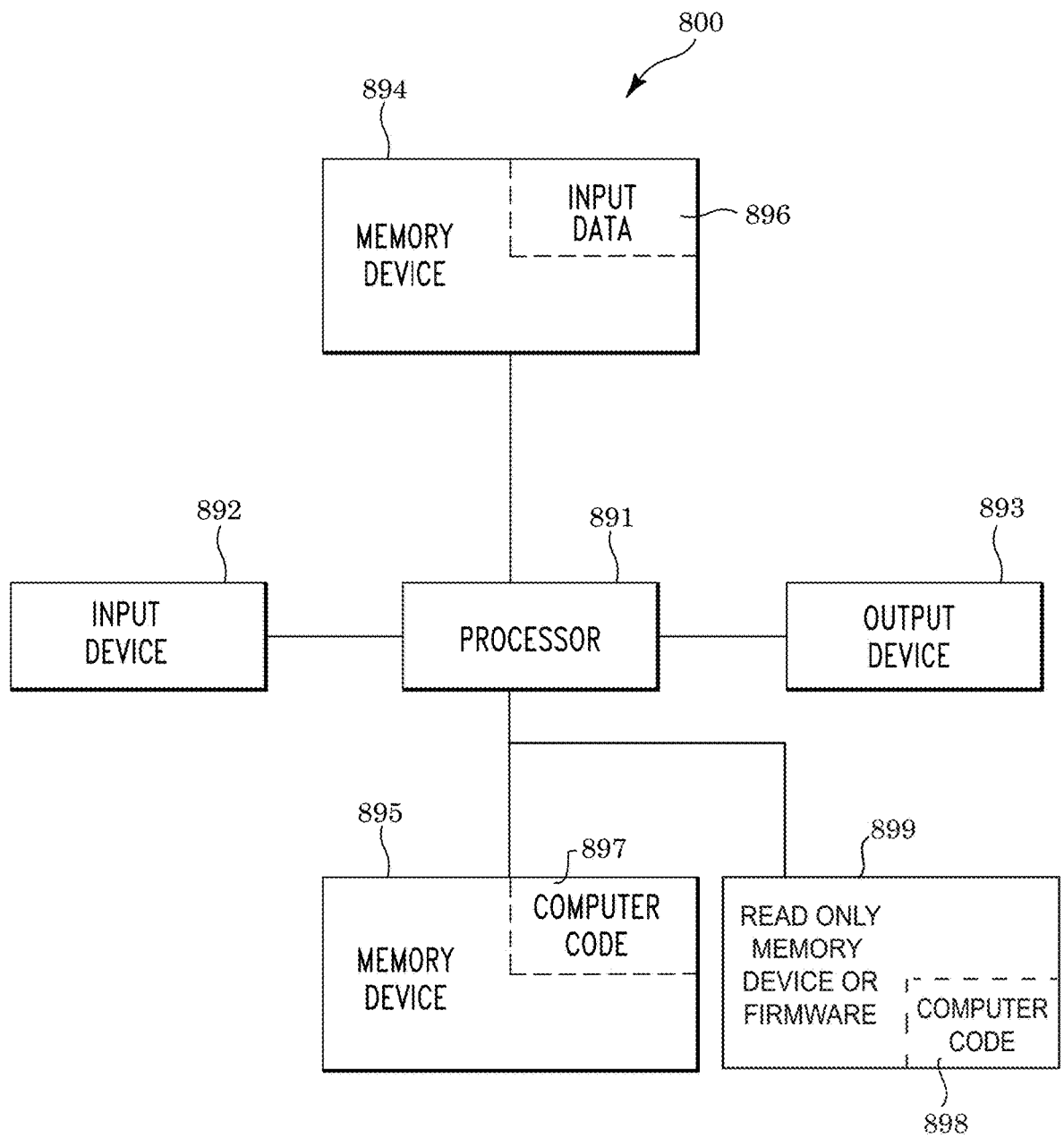
FIG. 8 depicts a block diagram of a computer system able to implement the methods for mapping data elements between a source data structure and a target data structure, consistent with the disclosure of the present application.

Referring to the drawings, FIG. 8 illustrates a block diagram of a computer system 800 that may be included in the systems of FIGS. 1-2, 4-7 and for implementing methods for mapping data elements between a source data structure and a target data structure of FIGS. 3 and 6, and in accordance with the embodiments described in the present disclosure. The computer system 800 may generally comprise a processor 891, otherwise referred to as a central processing unit (CPU), an input device 892 coupled to the processor 891, an output device 893 coupled to the processor 891, and memory devices 894 and 895 each coupled to the processor 891. The input device 892, output device 893 and memory devices 894, 895 may each be coupled to the processor 891 via a bus. Processor 891 may perform computations and control the functions of computer 800, including executing instructions included in the computer code 897 for tools and programs for mapping data elements between a source data structure and a target data structure, in the manner prescribed by the embodiments of the disclosure using the systems of FIGS. 1-2, 4-7, wherein the instructions of the computer code 897 may be executed by processor 891 via memory device 895. The computer code 897 may include software or program instructions that may implement one or more algorithms for implementing the methods for mapping data elements between a source data structure and a target data structure, as described in detail above. The processor 891 executes the computer code 897. Processor 891 may include a single processing unit, or may be distributed across one or more processing units in one or more locations (e.g., on a client and server).

The memory device 894 may include input data 896. The input data 896 includes any inputs required by the computer code 897, 898. The output device 893 displays output from the computer code 897, 898. Either or both memory devices 894 and 895 may be used as a computer usable storage medium (or program storage device) having a computer readable program embodied therein and/or having other data stored therein, wherein the computer readable program comprises the computer code 897, 898. Generally, a computer program product (or, alternatively, an article of manufacture) of the computer system 800 may comprise said computer usable storage medium (or said program storage device).

Memory devices 894, 895 include any known computer readable storage medium, including those described in detail below. In one embodiment, cache memory elements of memory devices 894, 895 may provide temporary storage of at least some program code (e.g., computer code 897, 898) in order to reduce the number of times code must be retrieved from bulk storage while instructions of the computer code 897, 898 are executed. Moreover, similar to processor 891, memory devices 894, 895 may reside at a single physical location, including one or more types of data storage, or be distributed across a plurality of physical systems in various forms. Further, memory devices 894, 895 can include data distributed across, for example, a local area network (LAN) or a wide area network (WAN). Further, memory devices 894, 895 may include an operating system (not shown) and may include other systems not shown in the figures.

In some embodiments, rather than being stored and accessed from a hard drive, optical disc or other writeable, rewriteable, or removable hardware memory device 894, 895, stored computer program code 898 (e.g., including algorithms) may be stored on a static, non-removable, read-only storage medium such as a Read-Only Memory (ROM) device 899, or may be accessed by processor 891 directly from such a static, non-removable, read-only medium 899. Similarly, in some embodiments, stored computer program code 897 may be stored as computer-readable firmware 899, or may be accessed by processor 891 directly from such firmware 899, rather than from a more dynamic or removable hardware data-storage device 895, such as a hard drive or optical disc.

In some embodiments, the computer system 800 may further be coupled to an Input/output (I/O) interface and a computer data storage unit (for example a data store, data mart or repository). An I/O interface may include any system for exchanging information to or from an input device 892 or output device 893. The input device 892 may be, inter alia, a keyboard, joystick, trackball, touchpad, mouse, sensors, beacons, RFD tags, microphones, biometric input device, camera, timer, etc. The output device 893 may be, inter alia, a printer, a plotter, a display device (such as a computer screen or monitor), a magnetic tape, a removable hard disk, a floppy disk, etc. The memory devices 894 and 895 may be, inter alia, a hard disk, a floppy disk, a magnetic tape, an optical storage such as a compact disc (CI)) or a digital video disc (DVD), a dynamic random access memory (DRAM), a read-only memory (ROM), etc. The bus may provide a communication link between each of the components in computer 800, and may include any type of transmission link, including electrical, optical, wireless, etc.

The I/O interface may allow computer system 800 to store information (e.g., data or program instructions such as program code 897, 898) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to mapping data elements between a source data structure and a target data structure. Thus, an embodiment of the present invention discloses a process for supporting computer infrastructure, where the process includes providing at least one support service for at least one of integrating, hosting, maintaining and deploying computer-readable code (e.g., program code 897, 898) in a computer system (e.g., computer 800) including one or more processor(s) 891, herein the processor(s) carry out instructions contained in the computer code 897 causing the computer system to map data elements between a source data structure and a target data structure. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for mapping data elements between a source data structure and a target data structure. Thus the present invention discloses a process for supporting, deploying and/or integrating computer infrastructure, integrating, hosting, maintaining, and deploying computer-readable code into the computer system 800, wherein the code in combination with the computer system 800 is capable of performing a method of mapping data elements between a source data structure and a target data structure.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which cute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for mapping data elements between a source data structure and a target data structure, said method comprising the steps of:

mapping, by a processor of a computer system, a source data element to a target data element by matching a source key and value pair stored in a source data structure to a target key and value pair of a target data structure, wherein the source key and value pair is a pairing of a first Soundex key with a value equal to the source data element, wherein the target key and value pair is a pairing of a second Soundex key and the target data element, wherein the source key and value pair and the target key and value pair are encoded to allow for alternative spellings or misspellings of the data elements stored by the source and target data structures, wherein said matching results in a plurality of target data elements, each target data element comprising Soundex keys matching a Soundex key of the source data element, and wherein said matching includes dynamically identifying the target key and value pair closest, but unequal to, the source key and value pair;

creating, by the processor, a parent source Soundex key for each parent element of the source data element;

creating, by the processor, a parent target Soundex key for each parent element of the plurality of target data elements matching the first Soundex key of the source data element;

comparing, by the processor, the parent source Soundex key for each parent element of the source data element with each parent target Soundex key; and mapping, by the processor, the source data element to the target data element having the parent target Soundex key that matches the parent source Soundex key.

2. The method of claim 1, wherein the source data structure and the target data structure are independently selected from the group consisting of an array, a file, a record, and a table.

3. The method of claim 1, wherein a match identified during said matching comprises a target key and value pair having the second Soundex key with a starting letter equal to a starting letter of the first Soundex key and a three-digit number that is within a pre-configured margin, but not equal to, the first Soundex key.

4. The method of claim 1, said method further comprising:

generating, by the processor, the first Soundex key as a function of a Soundex algorithm applied to the source data element; and generating, by the processor, the second Soundex key as a function of the Soundex algorithm applied to the target data element.

5. The method of claim 1, wherein the source key and value pair is stored in a first hash table in the source data structure, and wherein the target key and value pair is stored in a second hash table in the target data structure.

6. The method of claim 5, wherein the first hash table and the second hash table are different hash tables.

7. A computer system, comprising: a processor, a memory device coupled to the processor, and a computer readable storage device coupled to the processor, wherein the storage device contains program code executable by the processor via the memory device to implement a method for mapping data elements between a source data structure and a target data structure, said method comprising:

mapping, by the processor, a source data element to a target data element by matching a source key and value pair stored in a source data structure to a target key and value pair of a target data structure, wherein the source key and value pair is a pairing of a first Soundex key with a value equal to the source data element, wherein the target key and value pair is a pairing of a second Soundex key and the target data element, wherein the source key and value pair and the target key and value pair are encoded to allow for alternative spellings or misspellings of the data elements stored by the source and target data structures, wherein said matching results in a plurality of target data elements, each target data element comprising Soundex keys matching a Soundex key of the source data element, and wherein said matching includes dynamically identifying the target key and value pair closest, but unequal to, the source key and value pair;

creating, by the processor, a parent source Soundex key for each parent element of the source data element;

creating, by the processor, a parent target Soundex key for each parent element of the plurality of target data elements matching the first Soundex key of the source data element;

comparing, by the processor, the parent source Soundex key for each parent element of the source data element with each parent target Soundex key; and mapping, by the processor, the source data element to the target data element having the parent target Soundex key that matches the parent source Soundex key.

8. The computer system of claim 7, wherein the source data structure and the target data structure are independently selected from the group consisting of an array, a file, a record, and a table.

9. The computer system of claim 7, wherein a match identified during said matching comprises a target key and value pair having the second Soundex key with a starting letter equal to a starting letter of the first Soundex key and a three-digit number that is within a pre-configured margin, but not equal to, the first Soundex key.

10. The computer system of claim 7, said method further comprising:
    generating, by the processor, the first Soundex key as a function of a Soundex algorithm applied to the source data element; and
    generating, by the processor, the second Soundex key as a function of the Soundex algorithm applied to the target data element.

11. The computer system of claim 7, wherein the source key and value pair is stored in a first hash table in the source data structure, and wherein the target key and value pair is stored in a second hash table in the target data structure.

12. The computer system of claim 11, wherein the first hash table and the second hash table are different hash tables.

13. A computer program product, comprising: one or more computer readable hardware storage devices having computer readable program code stored therein, said program code containing instructions executable by one or more processors to implement a method for mapping data elements between a source data structure and a target data structure, said method comprising:
    mapping, by the processor, a source data element to a target data element by matching a source key and value pair stored in a source data structure to a target key and value pair of a target data structure, wherein the source key and value pair is a pairing of a first Soundex key with a value equal to the source data element, wherein the target key and value pair is a pairing of a second Soundex key and the target data element, wherein the source key and value pair and the target key and value pair are encoded to allow for alternative spellings or misspellings of the data elements stored by the source and target data structures, wherein said matching results in a plurality of target data elements, each target data element comprising Soundex keys matching a Soundex key of the source data element, and wherein said matching includes dynamically identifying the target key and value pair closest, but unequal to, the source key and value pair;
    creating, by the processor, a parent source Soundex key for each parent element of the source data element;
    creating, by the processor, a parent target Soundex key for each parent element of the plurality of target data elements matching the first Soundex key of the source data element;
    comparing, by the processor, the parent source Soundex key for each parent element of the source data element with each parent target Soundex key; and
    mapping, by the processor, the source data element to the target data element having the parent target Soundex key that matches the parent source Soundex key.

14. The computer program product of claim 13, wherein the source data structure and the target data structure are independently selected from the group consisting of an array, a file, a record, and a table.

15. The computer program product of claim 13, wherein a match identified during said matching comprises a target key and value pair having the second Soundex key with a starting letter equal to a starting letter of the first Soundex key and a three-digit number that is within a pre-configured margin, but not equal to, the first Soundex key.

16. The computer program product of claim 13, said method further comprising:
    generating, by the processor, the first Soundex key as a function of a Soundex algorithm applied to the source data element; and
    generating, by the processor, the second Soundex key as a function of the Soundex algorithm applied to the target data element.

17. The computer program product of claim 13, wherein the source key and value pair is stored in a first hash table in the source data structure, and wherein the target key and value pair is stored in a second hash table in the target data structure.

* * * * *